United States Patent
Varma (10) Patent No.: US 9,303,923 B2
(45) Date of Patent: Apr. 5, 2016

(54) AIR PROCESSOR ENCLOSURE

(71) Applicant: Sanjay Varma, Kowloon (HK)

(72) Inventor: Sanjay Varma, Kowloon (HK)

(*) Notice: Subject to any disclaimer, the term of this patent is extended or adjusted under 35 U.S.C. 154(b) by 584 days.

(21) Appl. No.: 13/826,459

(22) Filed: Mar. 14, 2013

(65) Prior Publication Data

US 2014/0260402 A1   Sep. 18, 2014

(51) Int. Cl.
*F24F 13/20* (2006.01)
*F28C 3/08* (2006.01)
*F24F 5/00* (2006.01)

(52) U.S. Cl.
CPC ............... *F28C 3/08* (2013.01); *F24F 5/0035* (2013.01); *F24F 13/20* (2013.01)

(58) Field of Classification Search
CPC ......... F24F 1/0007; F24F 5/0035; F24F 6/04; F24F 13/20; Y02B 30/545
See application file for complete search history.

(56) References Cited

U.S. PATENT DOCUMENTS

| | | | |
|---|---|---|---|
| 4,687,604 A * | 8/1987 | Goettl | F24F 6/04 261/106 |
| D362,905 S | 10/1995 | Wulf et al. | |
| 5,606,868 A | 3/1997 | Calvert | |
| 5,722,244 A * | 3/1998 | Shelton | F25C 1/12 62/298 |
| 6,223,548 B1 | 5/2001 | Calvert | |
| 6,344,630 B1 * | 2/2002 | Jarvis | A47J 39/006 219/386 |
| D641,845 S | 7/2011 | Breit et al. | |
| 2011/0232861 A1* | 9/2011 | Stewart | F24F 13/20 165/59 |

* cited by examiner

*Primary Examiner* — Cassey D Bauer
(74) *Attorney, Agent, or Firm* — Douglas Denninger (57) ABSTRACT

An enclosure having a base with a chamber for holding water, right and left side panels, front and rear frames for supporting grilles or other air passages, and a top panel. At least the base, the side panels and the top panel are blow molded as separate components each having an exterior wall and an interior wall, each wall having a contour which differs from that of the other wall, each wall having an inner surface and an outer surface, and each wall connected at its periphery to the other wall.

33 Claims, 12 Drawing Sheets

AIR PROCESSOR ENCLOSURE

FIELD OF THE INVENTION

The invention relates to air processors such as evaporative air coolers and more particularly to enclosures therefor constructed with multiple panels.

BACKGROUND OF THE INVENTION

Air processors include evaporative air coolers and humidifiers. Evaporative air coolers can provide a cost-effective alternative to air conditioners in a number of situations. One type of portable evaporative cooling unit is disclosed by Calvert in U.S. Pat. No. 5,606,868. Enclosures for air coolers is disclosed by Calvert in U.S. Pat. No. 6,223,548 and by Wulf and Calvert in U.S. Design Pat. 362,905, for example.

Currently, many varieties of evaporative air coolers exist in the market place. Generally, they are classifiable into (a) residential and light commercial-type coolers, and (b) industrial and heavy commercial-type coolers.

Most residential and light commercial air coolers typically use injection molded plastic as the material of the enclosure. Injection molded plastic offers an advantage of good aesthetics, several combinations of design options, and mass production capabilities. Most residential air coolers have poor cooling performance, and deliver low pressure air.

Industrial and heavy commercial-type coolers, on the other hand, are characterized by a rugged construction and high levels of cooling performance and delivery of high pressure air. Industrial and heavy commercial-type coolers are generally outdoor use capable, and much bigger in sizes as compared to residential air coolers.

To achieve ruggedness and strength for large size enclosures, industrial air cooler housing are generally made from metal, typically steel sheet, aluminum, or stainless steel. Some cooler varieties are also available with enclosures made in tough plastic materials constructed using rotation or "roto" molding, resin transfer, or FRP (fiber-reinforced polymer) technology. Some cooler varieties make use of injection molding for some components like front aesthetic grill, louvers etc. Very few air coolers use injection molding for a complete housing and, then, only for their small-size models. For larger-size models, they revert to metal or roto-molded enclosures.

Metal enclosures have disadvantages including: (a) lower productivities; (b) prone to rust and corrosion; (c) dimensional accuracies not achievable in close tolerances; (d) higher costs; (e) distortion in shape over a period of use; and (f) increased weight, causing difficulties in portability, and higher transportation and carriage costs.

Roto molded, FRP molded, or resin transfer molded enclosures have disadvantages including: (a) extremely lower productivities; (b) high levels of dimensional variation from piece to piece; (c) generally surface finishes are not very good or appealing; (d) usually needs secondary finishing operations after primary molding processes; (e) strength variation from piece to piece, i.e., process control is more challenging; and (f) generally higher weights than injection or blow molding.

Injection molded enclosures have disadvantages including: (a) molds are expensive; (b) moving cores required for undercuts and special shapes; (c) generally hollow articles not possible unless gas assisted injection molding is employed; (d) lower strengths as compared to roto or blow molding; (e) runners, sprue, gates, and, flashes are difficult to be 100% reused in new components; and (f) not all injection molding material grades are suitable for outdoor use. Also, the materials which are suitable for outdoor use need UV and other additives to be added to achieve proper outdoor capabilities.

It is therefore desirable to have enclosures with more advantages and fewer disadvantages.

SUMMARY OF THE INVENTION

An object of the present invention is to provide enclosures having high production rates and high impact strengths while providing better surface appearance, dimensional consistency and strength consistency.

Another object of the present invention is to reduce costs to manufacture such enclosures.

This invention features an enclosure having a base with a chamber for holding water, right and left side panels, front and rear frames for supporting grilles or other air passages, and a top panel. At least the base, the side panels and the top panel are blow molded as separate components each having an exterior wall and an interior wall, each wall having a contour which differs from that of the other wall, each wall having an inner surface and an outer surface, and each wall connected at its periphery to the other wall.

In some embodiments, each component includes integral features to engage corresponding features on at least two of the other components. In one embodiment, one of the side panels is capable of carrying electrical elements, and the other of the side panels is capable of carrying water control elements. In an embodiment, at least one of the frames supports a removable grille through which air is passed, such as drawn in or delivered out. In a number of embodiments, each component is formed of polyethylene. Preferably, the polyethylene has a low melt flow index, a high modulus of elasticity, and a high density.

In certain embodiments, an evaporation unit is supportable by portions of projecting inner walls of both side panels, the top panel, and the base. In one embodiment, at least two portions of the outer surface of the exterior wall of the base define support surfaces, such as attachment surfaces for wheels. In some embodiments, the interior wall of the base defines an upper boundary for the chamber to limit unintended movement of water within the chamber. Preferably, the interior wall of the base defines at least one access opening therethrough. In a number of embodiments, each blow-molded panel defines an insulative air gap between its interior and exterior walls. Preferably, each blow-molded panel has structural rigidity which is more than twice as great as the rigidity of a single one of its walls. In certain embodiments, at least two sides and the bottom of a pump are supportable by portions of the inner surface of the exterior wall of the base. Preferably, a portion of inner surface of the interior wall of the base is capable of supporting the top of the pump.

This invention may also be expressed as an evaporative air cooler having an evaporation unit and a pump each supported by different surfaces of blow-molded components of an enclosure as taught herein.

BRIEF DESCRIPTION OF THE DRAWINGS

In what follows, preferred embodiments of the invention are explained in more detail with reference to the drawings, in which.

DETAILED DESCRIPTION OF THE PRESENTLY PREFERRED EMBODIMENTS

This invention may be accomplished by an enclosure having a base with a chamber for holding water, right and left side panels, front and rear frames for supporting grilles for incoming or outgoing air, and a top panel. At least the base, the side panels and the top panel are blow molded as separate components and have an exterior wall and an interior wall, each wall having a contour which differs from that of the other wall, each wall having an inner surface and an outer surface, and each wall connected at its periphery to the other wall.

Enclosures according to the present invention with double walled blow molded panels preferably provide at least the following unique advantages: (a) outer surfaces and inner surfaces can perform different roles, thereby reducing the total number of components in the air cooler, humidifier or other air processor; (b) double walled construction imparts unparalleled rigidity and strength, thereby making it suitable for rugged construction, and can withstand higher user abuses; and (c) double walled construction also imparts thermal insulation. This ensures that the air which is evaporatively cooled through medium such as a honeycomb pad, or is otherwise processed, does not further get warmed up within the enclosure. Normally, a metal enclosure or single walled plastic enclosure will become heated by outdoor ambient heat and solar radiation, and the heat from such heated up enclosures tends to heat up the air inside the air cooler before being delivered to the environment. Thus, cooling efficiencies of similar sized and shaped air cooler with double walled blow molded enclosure will be better than that of injection or roto molded enclosures and will certainly be much better than that of metallic enclosures.

Blow molded enclosures offer the following advantages as compared to metallic enclosures: (a) faster production rates; (b) much better impact strengths; (c) dents and distortions often can be brought back to original shape by reverse pushing without breaking or cracking, and without rendering the part non-functional; (d) lesser product weight, ease and lower costs for portability and transportation; (e) no rusting or corrosion, thereby having a longer service life, especially for outdoor use; and (f) higher piece to piece consistencies in dimensions and shape.

Blow molded enclosures offer following advantages as compared to injection molded enclosures: (a) much higher impact strengths; (b) excellent ESCR (Environment Stress Crack Resistance); (c) hollow parts easily manufactured; (d) no cores required, even for most of the irregular shapes; (e) trim and flash can be 100% reusable for finished parts production, hence minimal or no wastage; and (f) blow molding molds are generally much lesser expensive than injection molds. Also, mold changes are much easier, thereby giving higher flexibility to make part geometry changes in response to customer needs.

Blow molded enclosures offer following advantages as compared to roto molded/FRP/resin transfer molded enclosures: (a) much faster production rates and higher productivities; (b) much better surface finish; (c) much better dimensional consistency and strength consistency; (d) can design much lighter, lower-weight blow molded parts as compared to roto molding/FRP/resin transfer for similar applications; and (e) double walled panels are readily made by blow molding.

Figure 1:
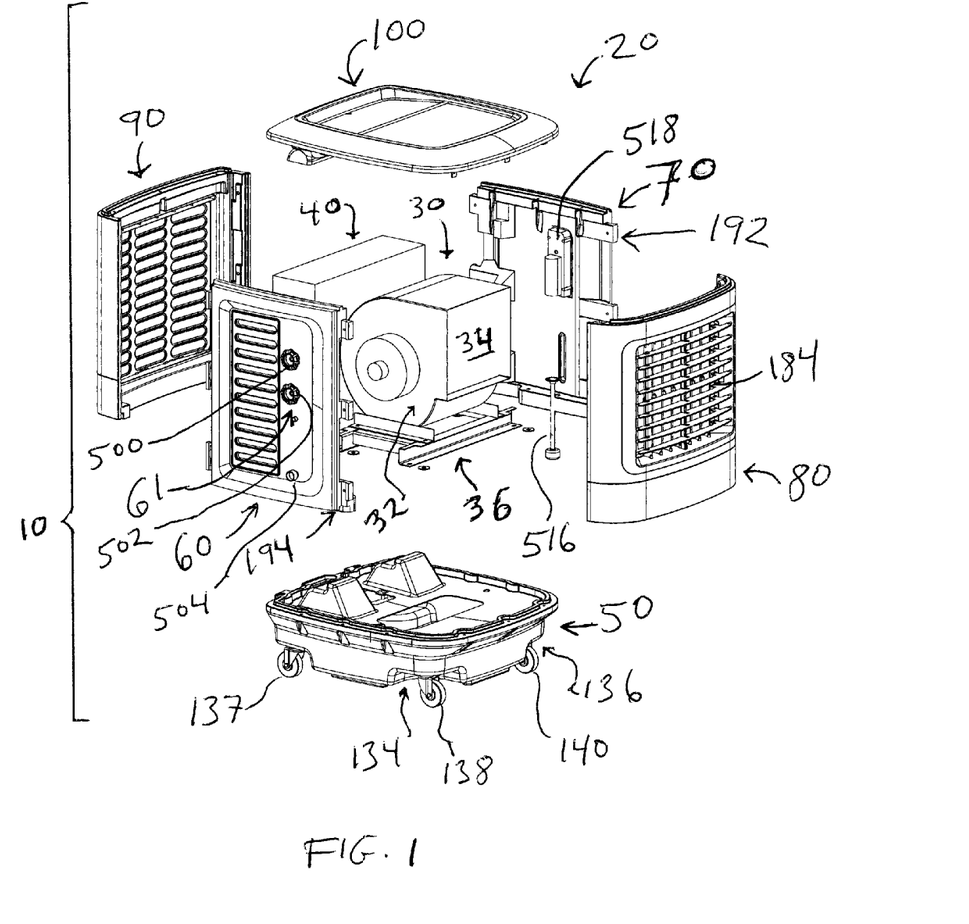
FIG. 1 is an expanded right-front perspective view of a multi-panel enclosure according to the present invention with a central blower and honeycomb chamber, together comprising a novel evaporative air cooler.

An evaporative air cooler 10 is shown in FIG. 1 with a multi-panel enclosure 20 according to the present invention, a central blower 30 and honeycomb evaporation chamber 40. Blower 30 includes a housing 32 defining an opening 34, and is secured by support 36 that is bolted to base 50 during assembly. Enclosure 20 includes base 50, top panel 100, side panels 60 and 70, and front and rear frames 80 and 90, also referred to as front and rear panels 80 and 90. All six primary components of enclosure 20 are formed as separate blow molded components in this construction.

Figure 1A:
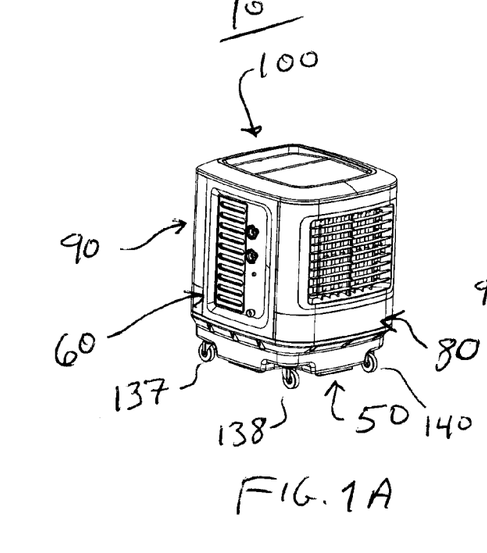
FIG. 1A is a perspective view similar to FIG. 1 showing the enclosure fully assembled.
Figure 1B:
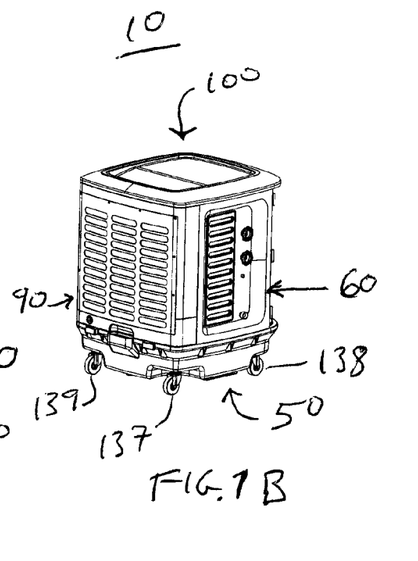
FIG. 1B is a rear perspective view of the assembled enclosure of FIG. 1A.
Figure 1C:
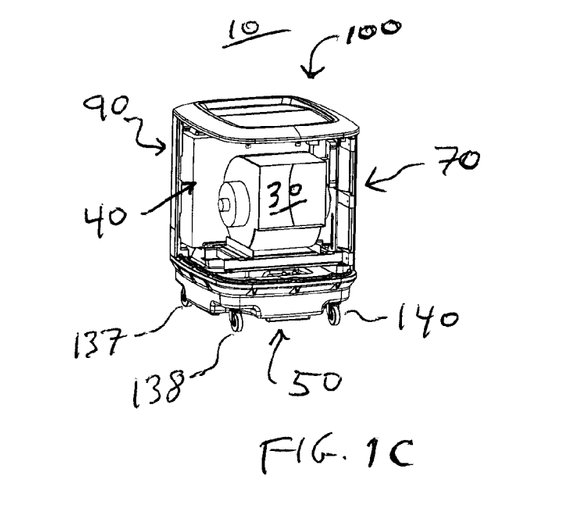
FIG. 1C is a view similar to FIG. 1A with a side and front panel removed.
Figure 2:
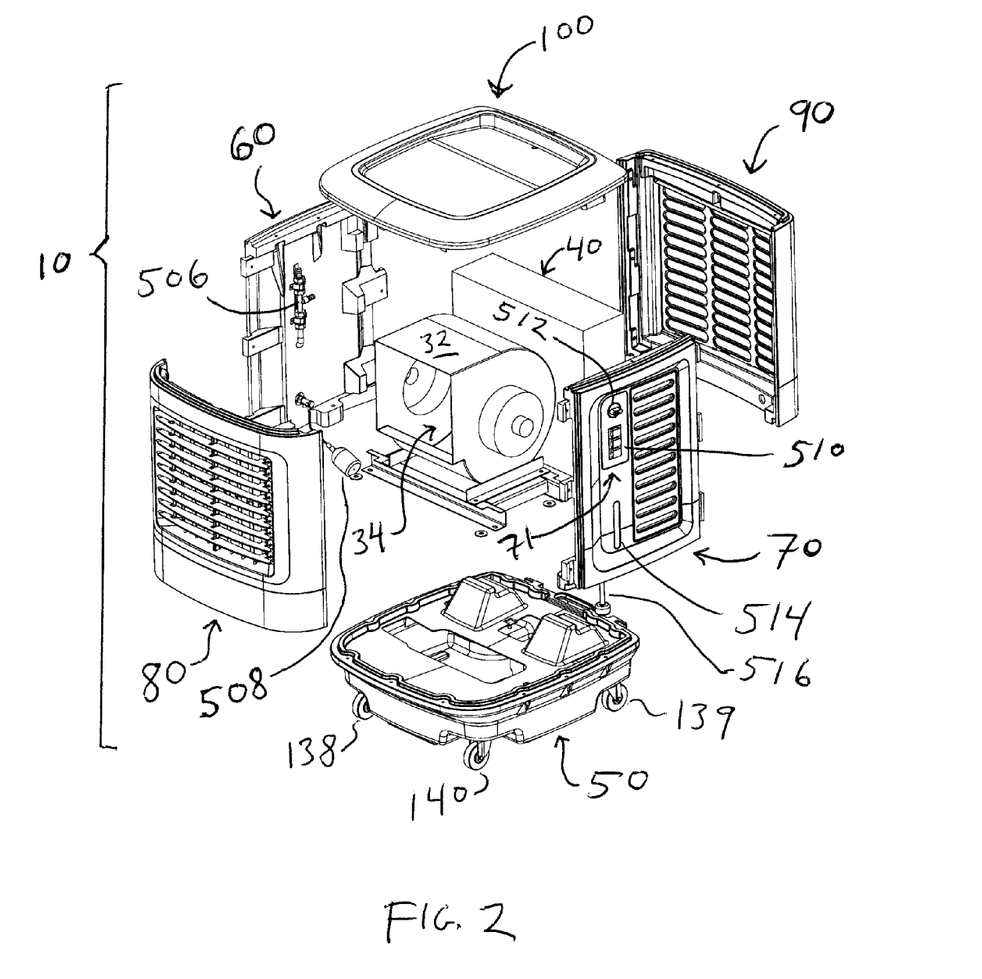
FIG. 2 is an expanded left-front perspective view of the novel air cooler of FIG. 1.

FIG. 1A is a perspective view similar to FIG. 1 showing the enclosure 20 fully assembled with the six primary components 50, 60, 70, 80, 90 and 100 interlocked with each other. In other words, each primary component mates with four other components in this construction. FIG. 1B is a rear perspective view of the assembled enclosure 20 of FIG. 1A. FIG. 1C is a view similar to FIG. 1A with side panel 60 and front frame 80 removed. FIG. 2 is an expanded left-front perspective view of the novel air cooler 10 of FIG. 1.

The six primary components of enclosure 20 are shown in FIGS. 3-16 as manufactured by blow molding, before controls, fixtures and other elements are installed. Examples of added elements include water control knobs 500, 502, FIG. 1, and hose coupling 504 on the outside of right side panel 60, which is in fluid communication with water line and filter 508, FIG. 2. Further in this construction, a float control 516 is installed within base 50, and an electrical control box 518, FIG. 1, is installed on the inside of panel 70 to be in electronic communication with buttons 510 and dial 512, FIG. 2.

Figure 3:
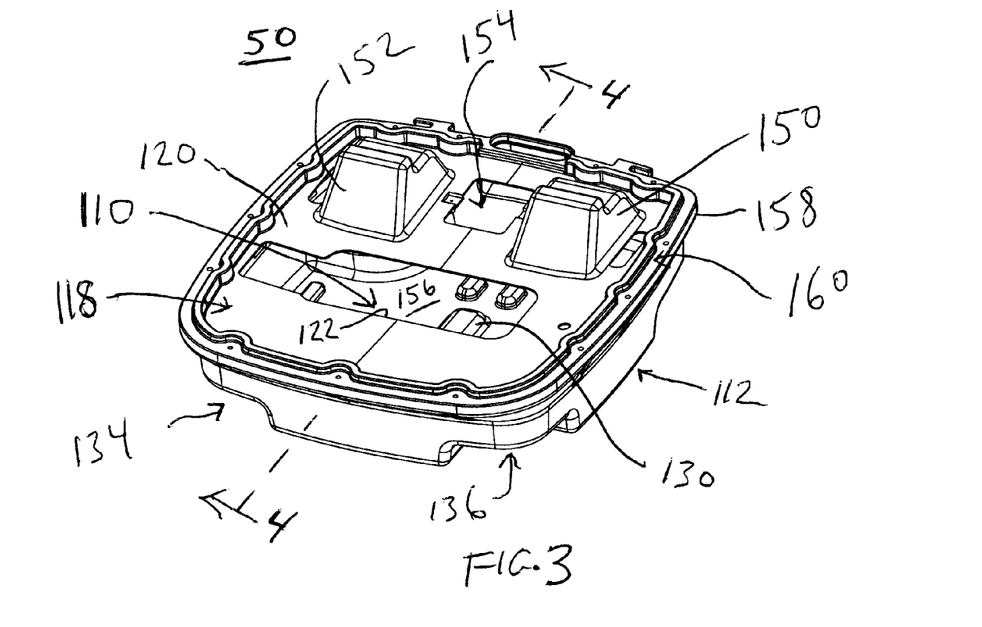
FIG. 3 is a front perspective upper view of the base of FIG. 1 having integral water tank, with wheels removed.

FIG. 3 is a perspective upper view of the base 50 of FIG. 1 with integral chamber 110 for storing water, also referred to as a water tank 110. Base 50 has an exterior wall 112 with an outer surface 114 and an inner surface 116 and an interior wall 118 having an outer surface 120 and an inner surface 122.

Figure 4:
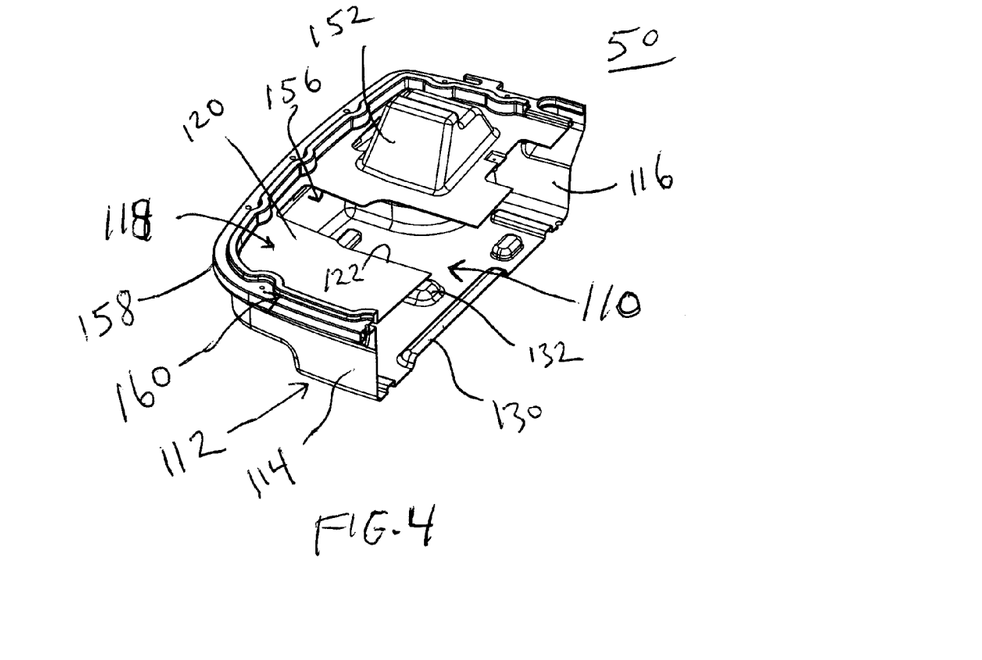
FIG. 4 is a partial cross-sectional view along lines 4-4 of FIG. 3.
Figure 4A:
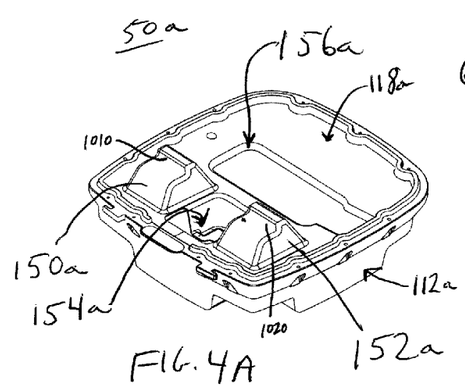
FIG. 4A is a view similar to FIG. 3, from a rear perspective, of an alternative base according to the present invention.
Figure 4B:
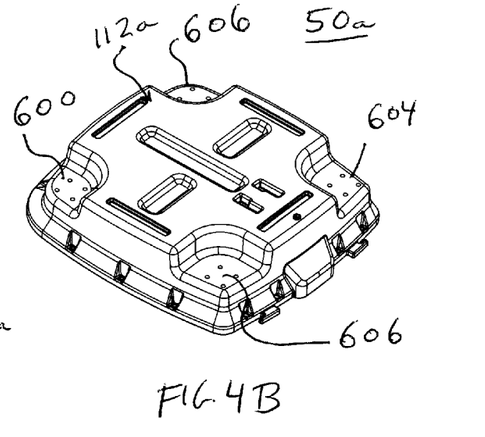
FIG. 4B is an underside view of the base of FIG. 4A.
Figure 4C:
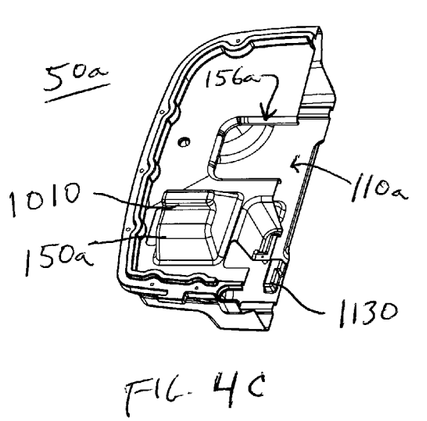
FIGS. 4C and 4D are partial cross-sectional right-side and left-side perspective views, respectively, of the base of FIG. 4A.
Figure 4D:
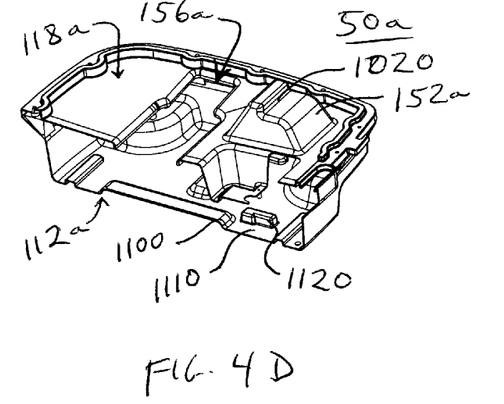
Figure 4E:
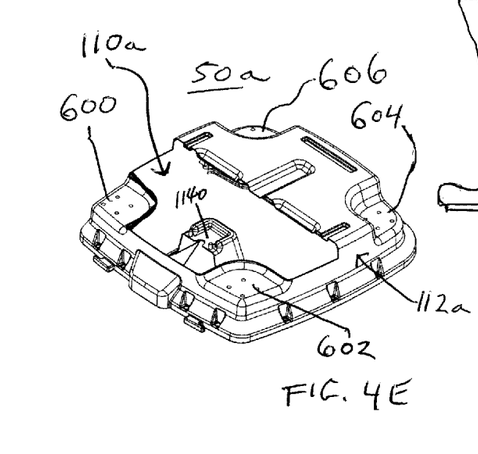
FIG. 4E is a partial cross-sectional view of the base of FIG. 4B.
Figure 4F:
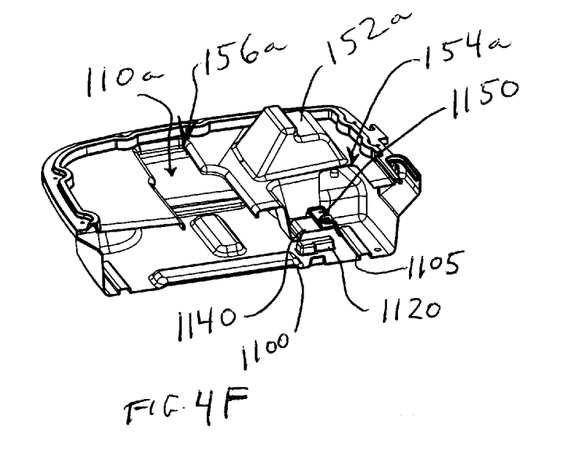
FIG. 4F is a view similar to FIG. 4D showing an upper pump support with clamp.
Figure 4G:
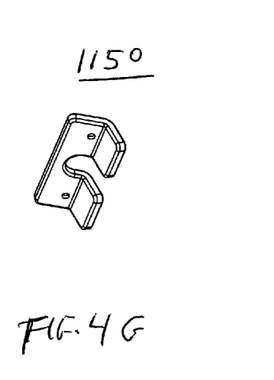
FIG. 4G is a perspective view of the clamp of FIG. 4F utilized to further secure the front portion of a pump in one construction.

Each wall 112 and 118 has a contour which differs from that of the other wall. For example, exterior wall 112 defines structural support ribs 130 and 132 and castor wheel wells 134 and 136 for wheels 138 and 140, FIGS. 1-2; similar wheel wells, also referred to as landings, support wheels 137 and 139 in this construction. In other constructions, exterior wall 112 defines stand elements, skids, lifting grips, or other positioning features. A drain plug (not shown) is preferably provided in a lower portion of exterior wall 112 in communication with chamber 110. Interior wall 118 defines features such as supports 150 and 152, FIGS. 3-4, for honeycomb evaporation unit 40, FIGS. 1-2, pump guidance and support, and access openings 154 and 156, FIGS. 3-4. In this construction, interior wall 118 further includes mounting rim 160 which engages the bottom edges of panels 60, 70, 80 and 90, FIGS. 1-2. Interior wall 118 also functions to reduce potential splashes of water occupying chamber 110 during movement of air cooler unit 10, which reduces the possibility of water contacting electrical parts and connections such as pumps, switches and wire junctions. Walls 112 and 118, FIGS. 3-4, are connected to each other at shared periphery 158.

Alternative base 50a is shown in similar views in FIGS. 4A-4F, with similar features such as chamber 110a, supports 150a and 152a, and access openings 154a and 156a. One or both of openings 154a and 156a can be closed by removable covers in some constructions. Landings 600, 602, 604 and 606, FIG. 4B, accept castors, wheels or other features on which base 50a is supported.

Figure 8:
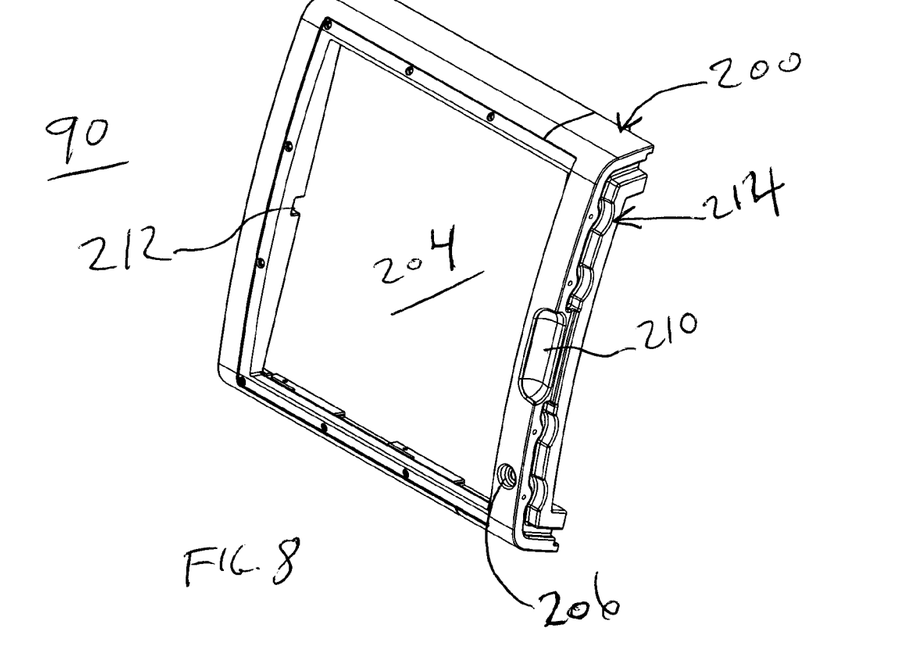
FIG. 8 is a perspective exterior view of the rear frame of FIG. 1 with rear grille removed.
Figure 8A:
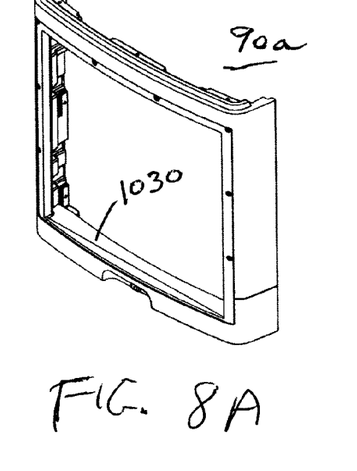
FIG. 8A is a view similar to FIG. 8 of an alternative rear frame according to the present invention.
Figure 11:
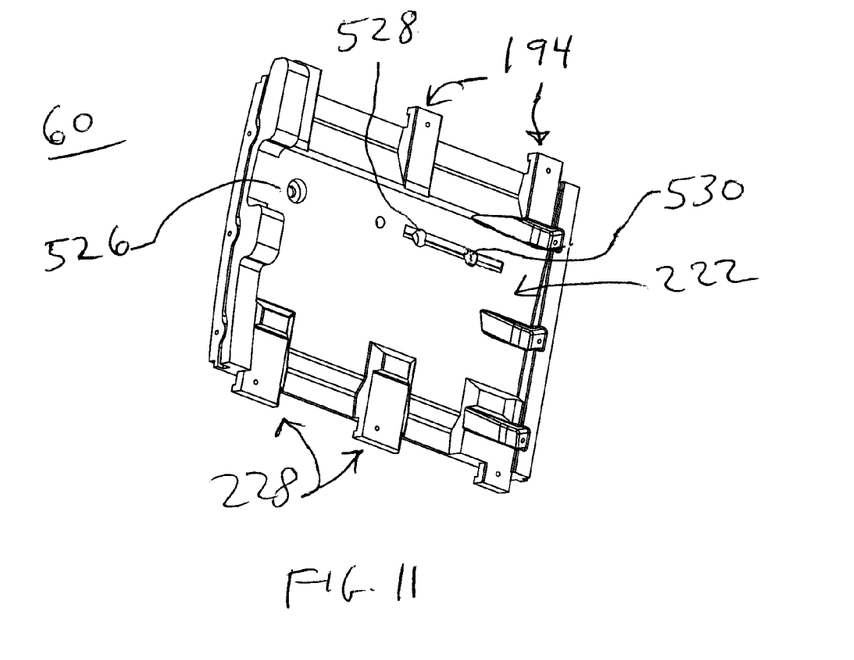
FIG. 11 is a perspective interior view of the right side panel of FIG. 10.
Figure 11A:
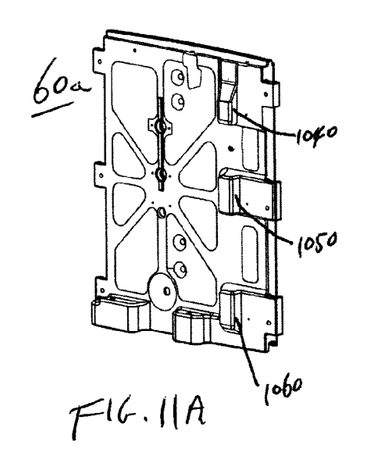
FIG. 11A is a view similar to FIG. 11 of an alternative right side panel according to the present invention.
Figure 13:
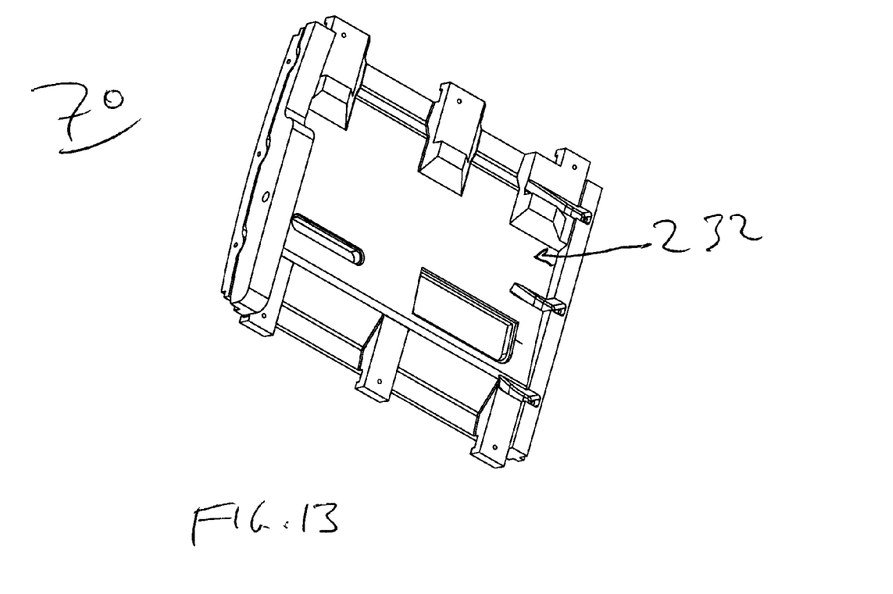
FIG. 13 is a perspective interior view of the left side panel of FIG. 12.
Figure 13A:
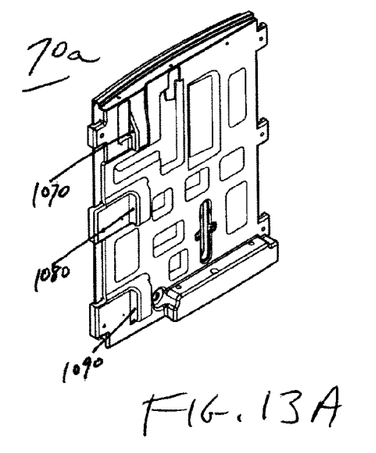
FIG. 13A is a view similar to FIG. 13 of an alternative left side panel according to the present invention.

An evaporative unit, similar to honeycomb unit 40, FIGS. 1-2, is supported in a unique manner by projecting walls 1010 and 1020 of base 50a, FIGS. 4A-4F, together with surfaces 1040, 1050 and 1060 of right side panel 60a, FIG. 11A, surfaces 1070, 1080 and 1090 of left side panel 70a, FIG. 13A, and surface 1030 of rear panel 90a, FIG. 8A. These surfaces collectively and cooperatively support an evaporative unit without requiring additional components, thereby speeding assembly and lowering cost to manufacture.

Figure 4H:
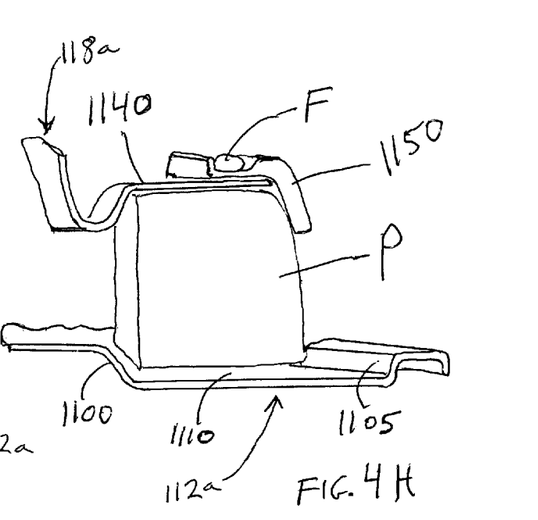
FIG. 4H is an enlarged partial perspective view of a pump secured to the base of FIG. 4F.

Support and securing of a submersible pump P, FIG. 4H, is also accomplished in a unique manner. Referring to FIGS. 4B-4H, the submersible pump P is supported at is front by surface 1100 of exterior wall 112a, at its bottom by surface 1110, at its left side by surface 1120, at its right side by surface 1130, and at its top side by surface 1140 of interior wall 118a. In one construction, the lower rear portion of the pump P is also supported by surface 1105. The pump P is insertable and removable as desired through access opening 154a in this construction. The upper portion of the rear side of the pump is then held in place by clamp 1150, FIGS. 4F-4H, and one or more fasteners F, FIG. H, which are separate components in this construction. This support technique ensures that the pump P is held securely in its place, without the need for securing with screws or other fasteners from the bottom of the tank, which is usually the case for conventional air coolers. Such conventional securing is prone to leakages from the attachment points, which become weakened during transit and handling.

Figure 5:
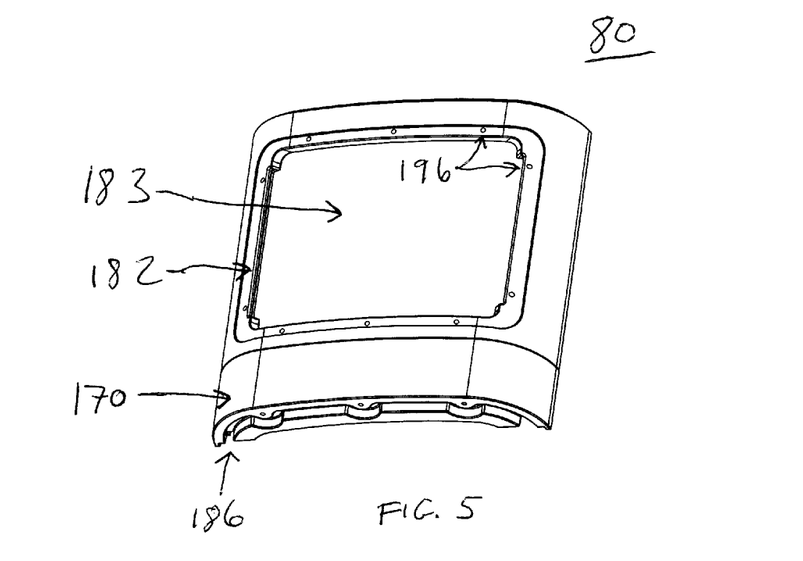
FIG. 5 is a perspective exterior view of the front frame of FIG. 1 with front grille removed.
Figure 6:
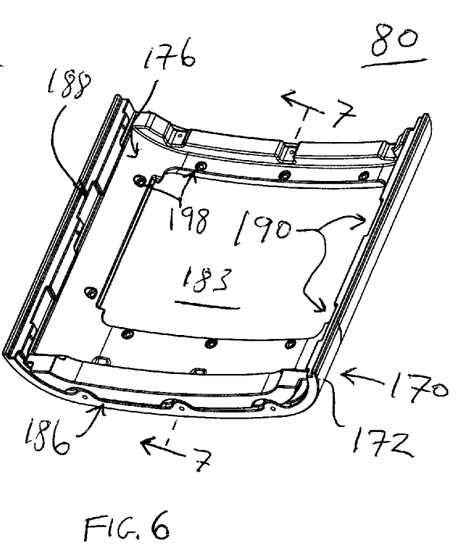
FIG. 6 is a perspective interior view of the front frame of FIG. 5.
Figure 7:
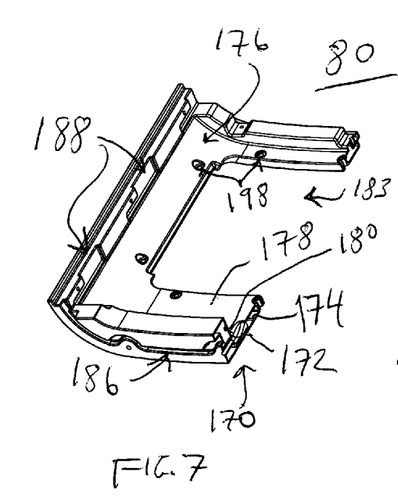
FIG. 7 is a partial cross-sectional view along lines 7-7 of FIG. 6.

The front frame or panel 80 of FIG. 1 is shown in more detail in FIGS. 5-7 having an exterior wall 170 with outer surface 172 and inner surface 174 and an interior wall 176 with an outer surface 178 and an inner surface 180. Each wall 170 and 176 has a contour which differs from that of the other wall, such as exterior wall 170 defining recess 182 and opening 183 for a removable grille 184, FIG. 1, with adjustable air deflection louvers through which cooled air is delivered out, as well as providing a pleasing aesthetic appearance. Interior wall 176, FIGS. 6-7, serves as a guide for a centrifugal fan or other blower within housing 32, FIG. 1. Interior wall 176 also defines recesses 188 and 190, FIGS. 6-7, which mate with corresponding projections 192 and 194 of side panels 70 and 60, FIG. 1, respectively. Some of the features are shared, such as openings 196 and 198 in walls 170, 176, respectively, for receiving screws, bolts or other fasteners. Each wall 170 and 176, FIGS. 5-7, is connected at its periphery to the other wall, such as at lower groove region 186 which receives rim 160 of base 50, FIGS. 3-4.

Figure 9:
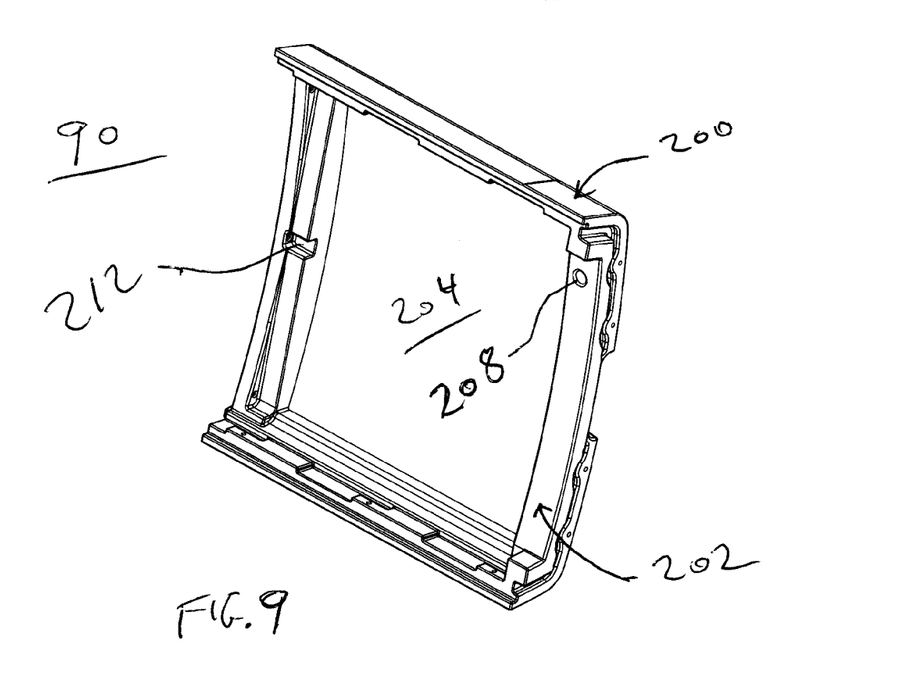
FIG. 9 is a perspective interior view of the rear frame of FIG. 8.

Rear frame 90, also referred to as back panel 90, of FIG. 1, is illustrated in FIGS. 8-9 having an exterior wall 200 and an interior wall 202, each wall having a contour which differs from that of the other wall, each wall having an inner surface and an outer surface, and each wall connected at its periphery to the other wall. Exterior wall 200 has structure to retain an air filter, such as a mesh material through which air is filtered and drawn into the enclosure 20, in opening 204 and defines an aperture 206 which matches aperture 208 of interior wall 202 to accept manual water inlet with a water inlet strainer or filter 508, FIG. 2, such as a nylon cloth supported in a plastic housing. Exterior wall 200, FIG. 8, can also provide an electrical cord wrap, as well as pleasing aesthetic looks and curves. Interior wall 202, FIG. 9, provides support and guidance to honeycomb pads 40, FIG. 1. Recess 210, FIG. 8, in exterior wall 200 may be engaged by a hand in some constructions and, in other constructions, accommodates a component. Recess 212, FIG. 9, in interior wall 202, can accommodate another component. Groove 214 mates with rim 160 of base 50, FIG. 1.

Figure 10:
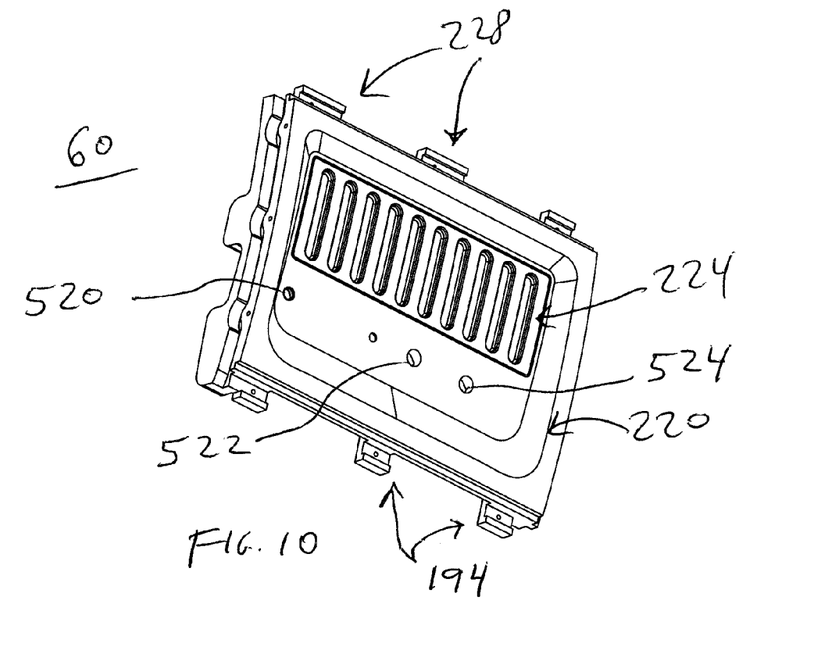
FIG. 10 is a perspective exterior view of the right side panel of FIG. 1 which carries water controls, removed in this view, in one construction.

Right side panel 60 of FIG. 1, which carries water controls 61 in one construction, is shown in FIGS. 10-11 having an exterior wall 220 and an interior wall 222, each wall having a contour which differs from that of the other wall, each wall having an inner surface and an outer surface, and each wall connected at its periphery to the other wall. In addition to providing pleasing aesthetic looks and surface variations 224, exterior wall 220 also houses water circuit components such as an auto drain valve, an auto fill valve, a water control valve (humidity variation valve) and corresponding knobs. Interior wall 222 provides side stopper support to honeycomb pads 40, and also provides connectivity to internal pipes and water distribution parts. Projections 194 mate with recesses 190 of front panel 80 and projections 228 mate with corresponding recesses in rear panel 90.

Left side panel 70 of FIGS. 1-2, which carries electrical controls 71, FIG. 2, in one construction, is shown in FIGS.

Figure 12:
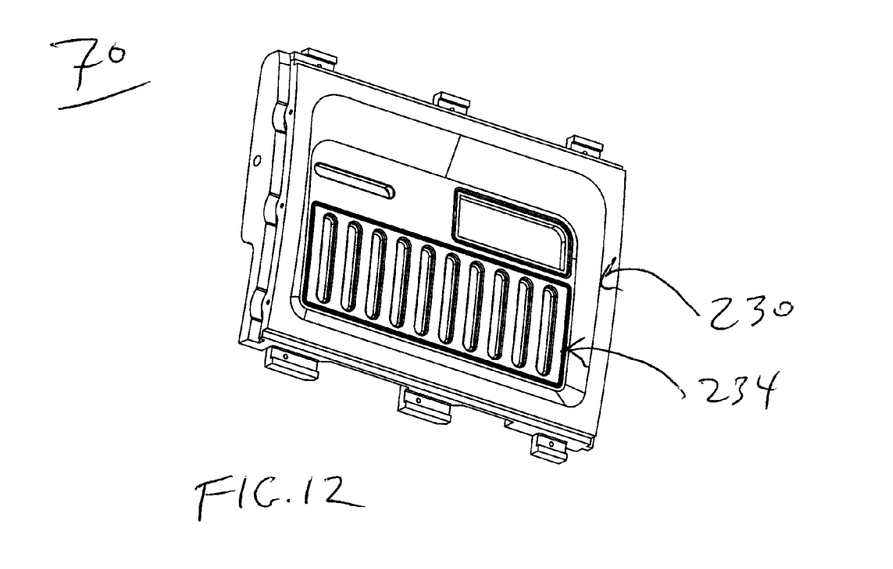
FIG. 12 is a perspective exterior view of the left side panel of FIG. 1 which carries electrical controls, removed in this view, in one construction.

12-13 having an exterior wall 230 and an interior wall 232, each wall having a contour which differs from that of the other wall, each wall having an inner surface and an outer surface, and each wall connected at its periphery to the other wall. Exterior wall 230 provides necessary pleasing aesthetic looks and surface variations 234 and also houses control panels and control knobs. Interior wall 232 provides side stopper support to honeycomb pads 40, and also provides connectivity to electrical box housing.

Figure 14:
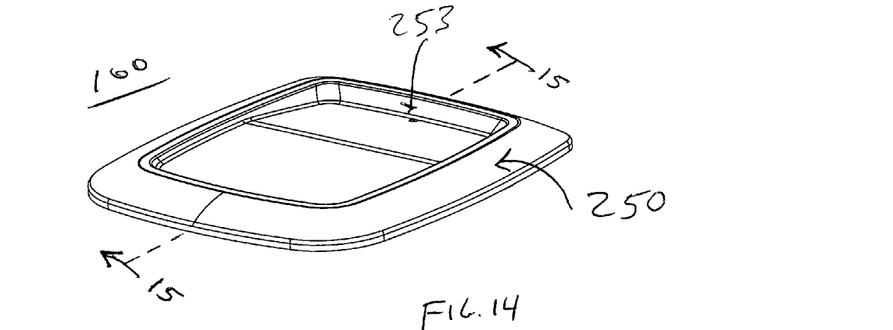
FIG. 14 is an exterior perspective view of the top panel of FIG. 1.
Figure 15:
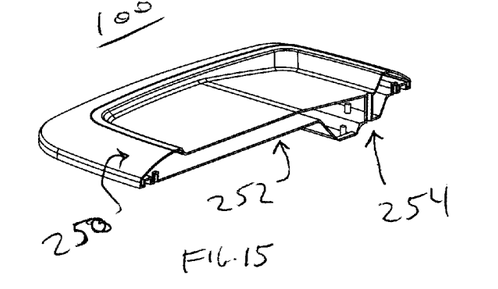
FIG. 15 is a partial cross-sectional view along lines 15-15 of FIG. 14.
Figure 16:
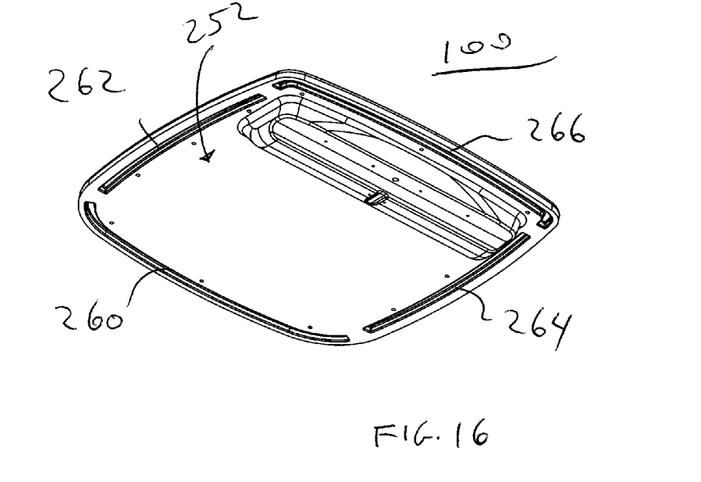
FIG. 16 is an a perspective interior view of the top panel of FIG. 14.

Top panel 100 of FIG. 1 is shown in FIGS. 14-16 having an exterior wall 250 and an interior wall 252, each wall having a contour which differs from that of the other wall, each wall having an inner surface and an outer surface, and each wall connected at its periphery to the other wall. Exterior wall 250 provides necessary pleasing aesthetic looks and contours and also provides space for storage of operator or service technicians tools and parts, and, in some constructions, beverage cans and bottles. Interior wall 252 of top panel provides top support to honeycomb pads 40 and also provides guidance for water distribution channel 253, 254. Ribs 260, 262, 264 and 266 mate with corresponding grooves in panels 80, 70, 90 and 60, respectively.

Although specific features of the present invention are shown in some drawings and not in others, this is for convenience only, as each feature may be combined with any or all of the other features in accordance with the invention. While there have been shown, described, and pointed out fundamental novel features of the invention as applied to one or more preferred embodiments thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. An air processor enclosure comprising:
   a base having a base exterior wall and a base interior wall, each wall of the base having a contour which differs from that of the other wall of the base, each wall of the base having an inner surface and an outer surface, and each wall of the base connected at its periphery to the other wall of the base, at least a portion of the inner surface of the base exterior wall defining a chamber for holding water;
   a right side panel having a right side exterior wall and a right side interior wall, each wall of the right side panel having a contour which differs from that of the other wall of the right side panel, each wall of the right side panel having an inner surface and an outer surface, and each wall of the right side panel connected at its periphery to the other wall of the right side panel;
   a left side panel having a left side panel exterior wall and a left side panel interior wall, each wall of the left side panel having a contour which differs from that of the other wall of the left side panel, each wall of the left side panel having an inner surface and an outer surface, and each wall of the left side panel connected at its periphery to the other wall of the left side panel;
   a front frame defining at least one opening through which processed air can be delivered;
   a rear frame capable of admitting ambient air to be processed; and
   a top panel having a top panel exterior wall and a top panel interior wall, each wall of the top panel having a contour which differs from that of the other wall of the top panel, each wall of the top panel having an inner surface and an outer surface, and each wall of the top panel connected at its periphery to the other wall of the top panel;
   wherein at least the base, the left and right side panels, and the top panel, are blow molded as separate components.

2. The enclosure of claim 1 wherein each of the base, right side panel, left side panel, and top panel includes integral features to engage corresponding features on at least two of the other of the base, right side panel, left side panel, and top panel.

3. The enclosure of claim 1 wherein one of the left or right side panels is capable of carrying electrical elements.

4. The enclosure of claim 3 wherein the other of the left or right side panels is capable of carrying water control elements.

5. The enclosure of claim 1 wherein at least one of the front or rear frames supports a removable grille through which air is passed.

6. The enclosure of claim 1 wherein each of the base, right side panel, left side panel, and top panel is formed of polyethylene.

7. The enclosure of claim 6 wherein the polyethylene has a low melt flow index, a high modulus of elasticity, and a high density.

8. The enclosure of claim 1 wherein an evaporation unit is supportable by portions of projecting inner walls of both left and right side panels, the top panel, and the base.

9. The enclosure of claim 1 wherein at least two portions of the outer surface of the exterior wall of the base define support surfaces.

10. The enclosure of claim 9 wherein the support surfaces provide attachment surfaces for wheels.

11. The enclosure of claim 1 wherein the interior wall of the base defines an upper boundary for the chamber to limit unintended movement of water within the chamber.

12. The enclosure of claim 11 wherein the interior wall of the base defines at least one access opening therethrough.

13. The enclosure of claim 1 wherein each blow-molded left and right side and top panel defines an insulative air gap between its respective interior and exterior walls.

14. The enclosure of claim 1 wherein each blow-molded left and right side and top panel has structural rigidity which is more than twice as great as the rigidity of a single one of its respective interior or exterior walls.

15. The enclosure of claim 1 wherein at least two of the left and right side panels and the bottom of a pump are supportable by portions of the inner surface of the exterior wall of the base.

16. The enclosure of claim 15 wherein a portion of inner surface of the interior wall of the base is capable of supporting the top of the pump.

17. An enclosure for an evaporative air cooler, the enclosure comprising:
   a base having a base exterior wall and a base interior wall, each wall of the base having a contour which differs from that of the other wall of the base, each wall of the base having an inner surface and an outer surface, and each wall of the base connected at its periphery to the other wall of the base, at least a portion of the inner surface of the exterior wall of the base defining a chamber for holding water;

a right side panel having a right side exterior wall and a right side interior wall, each wall of the right side panel having a contour which differs from that of the other wall of the right side panel, each wall having of the right side panel an inner surface and an outer surface, and each wall of the right side panel connected at its periphery to the other wall of the right side panel;

a left side panel having a left side panel exterior wall and a left side panel interior wall, each wall of the left side panel having a contour which differs from that of the other wall of the left side panel, each wall having of the left side panel an inner surface and an outer surface, and each wall of the left side panel connected at its periphery to the other wall of the left side panel;

a front frame defining at least one opening through which evaporatively cooled air can be blown and having a front frame exterior wall and a front frame interior wall, each wall of the front frame having a contour which differs from that of the other wall of the front frame, each wall having an inner surface and an outer surface, and each wall of the front frame connected at its periphery to the other wall of the front frame;

a rear frame capable of admitting ambient air to be cooled and having a rear frame exterior wall and a rear frame interior wall, each wall of the rear frame having a contour which differs from that of the other wall of the rear frame, each wall of the rear frame having an inner surface and an outer surface, and each wall of the rear frame connected at its periphery to the other wall of the rear frame; and a top panel having a top panel exterior wall and a top panel interior wall, each wall of the top panel having a contour which differs from that of the other wall of the top panel, each wall of the top panel having an inner surface and an outer surface, and each wall of the top panel connected at its periphery to the other wall of the top panel;

wherein at least the base, the left and right side panels, the front and rear frames and the top panel are blow molded as separate components, each of the base, the left and right side panels, the front and rear frames, and the top panel having integral features for mating with corresponding features on four of the other of the base, the side panels, the front and rear frames and the top panel.

18. The enclosure of claim 17 wherein one of the left and right side panels is capable of carrying electrical elements and the other of the left and right side panels is capable of carrying water control elements.

19. The enclosure of claim 18 wherein at least one of the front and rear frames supports a filter through which air is drawn into the enclosure and the other of the front and rear frames supports a grille through which air is delivered out of the enclosure.

20. The enclosure of claim 17 wherein each of the base, the side panels, the front and rear frames, and the top panel is formed of polyethylene.

21. The enclosure of claim 20 wherein the polyethylene has a low melt flow index, a high modulus of elasticity, and a high density.

22. The enclosure of claim 17 wherein a honeycomb-type evaporation unit is supportable by portions of projecting inner walls of both left and right side panels, the top panel, and the base.

23. The enclosure of claim 17 wherein at least three portions of the outer surface of the exterior wall of the base define support surfaces that provide attachment surfaces for wheels.

24. The enclosure of claim 17 wherein the interior wall of the base defines an upper boundary for the chamber to limit unintended movement of water within the chamber, and the interior wall further defines at least one access opening therethrough.

25. The enclosure of claim 17 wherein each of the left and right side blow-molded panels defines an insulative air gap between its respective interior and exterior walls.

26. The enclosure of claim 25 wherein each of the base, the left and right side panels, the front and rear frames, and the top blow-molded panels has structural rigidity which is more than twice as great as the rigidity of a single one of its respective interior or exterior walls.

27. The enclosure of claim 24 wherein at least two of the left and right side panels and the bottom of a pump are supportable by portions of the inner surface of the exterior wall of the base.

28. The enclosure of claim 27 wherein a portion of inner surface of the interior wall of the base is capable of supporting the top of the pump.

29. An evaporative air cooler, comprising:

a base having a base exterior wall and a base interior wall, each wall of the base having a contour which differs from that of the other wall of the base, each wall of the base having an inner surface and an outer surface, and each wall of the base connected at its periphery to the other wall of the base, at least a portion of the inner surface of the exterior wall of the base defining a chamber for holding water, the interior wall of the base defining an upper boundary for the chamber to limit unintended movement of water within the chamber, and the interior wall of the base further defines at least one access opening therethrough;

a pump having a top, a bottom, and sides, the pump being supported on at least two sides and its bottom by portions of the inner surface of the exterior wall of the base;

a right side panel having a right side panel exterior wall and a right side panel interior wall, each right side panel wall having a contour which differs from that of the other right side panel wall, each right side panel wall having an inner surface and an outer surface, and each right side panel wall connected at its periphery to the other right side panel wall;

a left side panel having a left side panel exterior wall and a left side panel interior wall, each left side panel wall having a contour which differs from that of the other left side panel wall, each left side panel wall having an inner surface and an outer surface, and each left side panel wall connected at its periphery to the other left side panel wall;

one of the left or right side panels carrying electrical elements and the other of the left or right side panels carrying water control elements;

a front frame defining at least one opening through which evaporatively cooled air can be blown and having a front frame exterior wall and a front frame interior wall, each wall having a contour which differs from that of the other front frame wall, each front frame wall having an inner surface and an outer surface, and each front frame wall connected at its periphery to the other front frame wall;

a rear frame capable of admitting ambient air to be cooled and having a rear frame exterior wall and a rear frame interior wall, each rear frame wall having a contour which differs from that of the other rear frame wall, each rear frame wall having an inner surface and an outer surface, and rear frame each wall connected at its periphery to the other rear frame wall;

at least one of the front and rear frames supporting a grille through which air is passed;

a top panel having a top panel exterior wall and a top panel interior wall, each top panel wall having a contour which differs from that of the other top panel wall, each top panel wall having an inner surface and an outer surface, and each top panel wall connected at its periphery to the other top panel wall; and an evaporation unit supported by portions of projecting inner walls of both left and right side panels, the top panel, and the base;

wherein at least the base, the left and right side panels, the front and rear frames and the top panel are blow molded as separate components, each of the base, the left and right side panels, the front and rear frames and the top panel having integral features for mating with corresponding features on four of the other of the base, the left and right side panels, the front and rear frames and the top panel, and each blow-molded left and right side panel defining an insulative air gap between its respective interior and exterior walls.

30. The cooler of claim 29 wherein each of the base, the left and right side panels, the front and rear frames, and the top panel is formed of polyethylene having a low melt flow index, a high modulus of elasticity, and a high density.

31. The cooler of claim 29 wherein at least three portions of the outer surface of the exterior wall of the base define support surfaces that provide attachment surfaces for wheels.

32. The cooler of claim 29 wherein each blow-molded left and right side panel has structural rigidity which is more than twice as great as the rigidity of a single one of its respective walls.

33. The cooler of claim 29 wherein a portion of inner surface of the interior wall of the base supports the top of the pump.

* * * * *